R. JOHNSON.
COUPLING.
APPLICATION FILED NOV. 24, 1908.
932,869.
Patented Aug. 31, 1909.
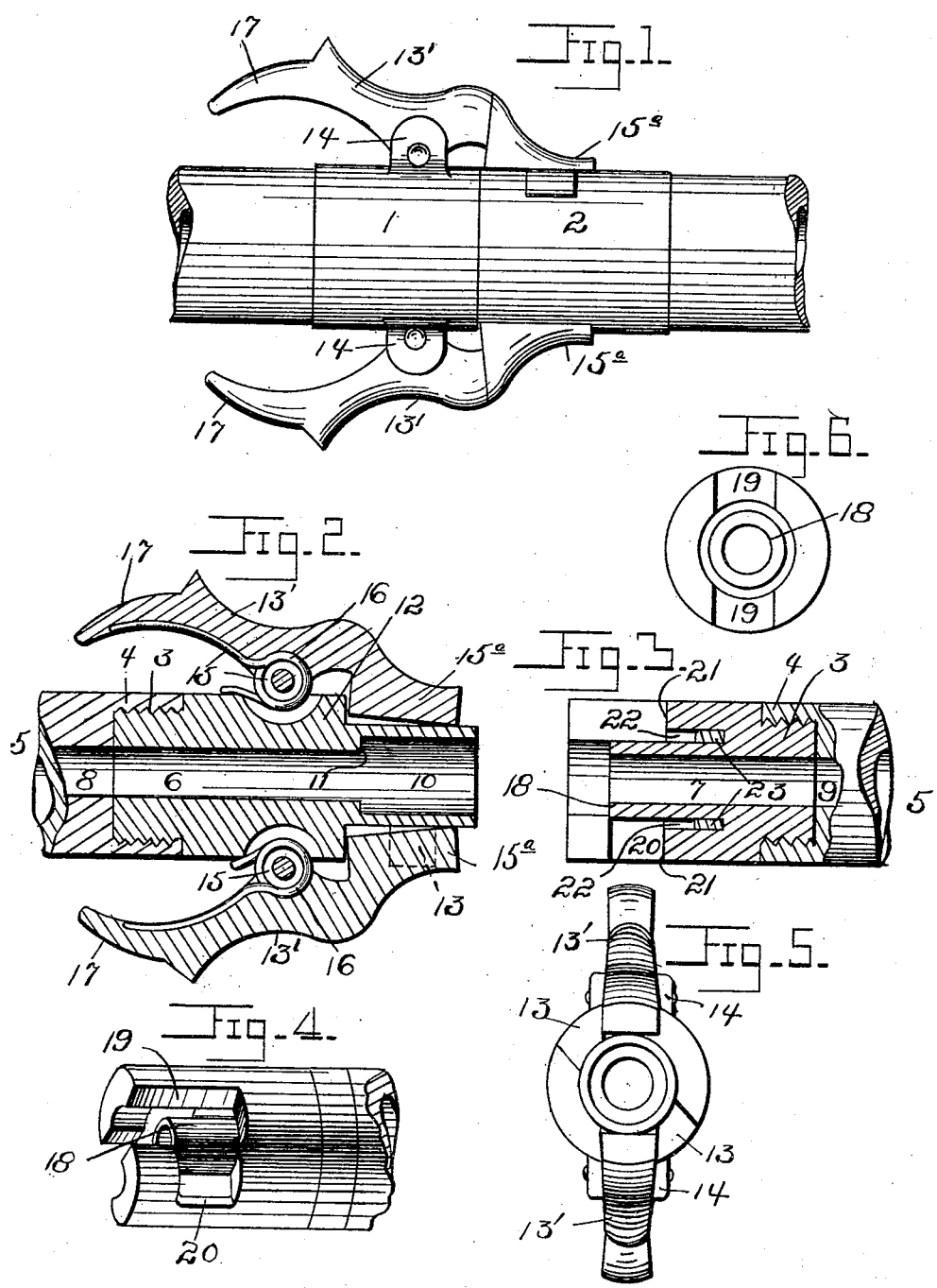
Witnesses
[signatures]
Inventor
Robert Johnson.
By E. E. Vrooman
his Attorney.

UNITED STATES PATENT OFFICE.

ROBERT JOHNSON, OF BROWN STATION, NEW YORK.

COUPLING.

932,869. Specification of Letters Patent. Patented Aug. 31, 1909.

Application filed November 24, 1908. Serial No. 464,233.

*To all whom it may concern:*

Be it known that I, ROBERT JOHNSON, a citizen of the United States, residing at Brown Station, in the county of Ulster and State of New York, have invented certain new and useful Improvements in Couplers, of which the following is a specification, reference being had therein to the accompanying drawing.

This invention comprises certain novel improvements in detachable pipe couplings and has specially in view a novel type of locking mechanism therefor which will hold the pipes in a liquid or gas tight connection, but which may be readily unlocked to permit the pipe sections to be separated.

In carrying out the objects of the invention generally stated above it will, of course, be understood that the same is susceptible of modifications of details and structural changes, but a preferred and practical embodiment of the same is shown in the accompanying drawings, wherein—

Figure 1 is a view in side elevation of the improved pipe coupler. Fig. 2 is a longitudinal sectional view of one of the coupler members. Fig. 3 is a similar view of the other coupler member. Fig. 4 is a perspective view of the coupler member shown in Fig. 3. Fig. 5 is an end elevation of the coupler member shown in Fig. 2. Fig. 6 is an end elevation of the coupler member shown in Fig. 4.

Like characters of reference designate corresponding parts.

The improved detachable pipe or hose coupler comprises primarily two coupler members 1 and 2, each of which have their rear ends reduced and exteriorly threaded as indicated at 3 for engagement with the interiorly threaded ends 4 of the pipe sections 5. The said coupler members 1 and 2 are each provided with a longitudinal opening 6 and 7, which register with, and are of substantially the same diameter as the openings 8 and 9 of said pipe sections.

The forward end of the opening 6 of the pipe coupler member 1 is enlarged, as indicated at 10, and at the junction of said enlarged portion 10 and the opening 6, a shoulder 11 is formed. The exterior of the enlarged opening 10 is of smaller diameter than the main body 12 of the coupler member, and said exterior surface is provided with diametrically oppositely located outstanding locking lugs 13, said lugs 13 being preferably arranged on said surface so that there will be ample clearance space between them and the abutment shoulder formed by the junction of said surface and the main body 12. The said main body 12 is provided with oppositely disposed outstanding pivot ears 14 which receive pivot ears 15 carried by latching levers 13', the locking ends 15$^2$ of which normally lie parallel with the exterior surface of the enlarged opening 10 and below the plane of the exterior surface of the main body 12. A spring 16 is interposed between the handle 17 of said levers and the body 12 and exerts a pressure tending to force the locking ends 15$^a$ to their locking positions, as will presently appear.

The opening 7 formed through the coupler member 2 terminates in a tube extension 18, and the main body of the said member at its forward end is provided on opposite sides with longitudinal slots 19 which terminate in transversely extending locking recesses 20, the arrangement of slots and end recesses being such that the main body at its forward, or coupling end presents oppositely disposed longitudinally arranged slots which permit of the entrance therein of the lugs 13 of the coupler member 1 until the ends of said slots are reached, whereupon the coupler members may be turned relatively to cause said lugs to enter the locking recesses 20. It will be observed by reference to Fig. 3 of the drawings, that the abutment shoulder 21 formed at the end of the slots 19 overhangs the tube extension 18, a recess 22 being provided between said tube and said overhanging portion into which a gasket or packing material 23 is forced.

To lock the coupler members 1 and 2 together, the slots 19 are alined with the lugs 13 of the coupler member 1, the locking levers raised against the tension of their springs, and the two members pushed together. The tube extension 18 enters the enlarged end 10 of the coupler member 1 until it abuts against the shoulder 11, and the lugs enter the slots 19 until they abut against the shoulder 21, while the said portion 10 enters the recess 22 until it abuts against the gasket or packing therein. A relative turning of the two coupler members will at this point, cause the locking lugs to enter the end recesses 20, after which, by releasing the locking levers, the locking ends of the same will be thrown into said slots 19 across the entrance to the recesses 20, and thereby retain the locking lugs therein. To release the coupler members, the locking levers are rocked on their pivots, a relative turning of the couplers will release the lugs from the recesses, and the members may be readily pulled from their interlocking nested position.

It will be seen that the improved coupler is one that may be readily locked or unlocked, and further, that by means of the arrangements of the ends of said couplers, the tubes thereof are held one within another in such a manner that there is no danger of a leak, and also that they mutually strengthen one another so that the coupler is able to withstand any pressure that may be imposed upon it.

Claim:—

A pipe coupler comprising a tubular coupling member having a reduced forwardly extending tubular projection, locking lugs on said projection, a pair of spring pressed latching levers pivotally mounted on said coupling member, said levers being each provided with a latching head normally held in contact with the said projection and across one face of the lugs thereon, a second tubular coupling member provided at its forward edge with oppositely disposed angular slots adapted to receive said lugs and to be closed by the heads of said levers, and a tubular projection and a recess carried by said second coupling member adapted for interlocking engagement with the tubular projection of the first-mentioned coupling member.

In testimony whereof I hereunto affix my signature in presence of two witnesses.

ROBERT JOHNSON.

Witnesses:
C. H. SMEAD,
LITTLETON FITZGERALD, Jr.